United States Patent [19]

Cortney et al.

[11] Patent Number: 5,418,921
[45] Date of Patent: May 23, 1995

[54] METHOD AND MEANS FOR FAST WRITING DATA TO LRU CACHED BASED DASD ARRAYS UNDER DIVERSE FAULT TOLERANT MODES

[75] Inventors: James E. Cortney; Jaishankar M. Menon, both of San Jose, Calif.

[73] Assignee: International Business Machines Corporation, Armonk, N.Y.

[21] Appl. No.: 878,810

[22] Filed: May 5, 1992

[51] Int. Cl.6 .................... G06F 13/00; G06F 12/00; G06F 12/08

[52] U.S. Cl. .................... 395/425; 364/243.41; 364/222.82; 364/256.6; 364/964; 364/DIG. 1; 364/965.79; 364/964.34; 364/957.8; 364/DIG. 2

[58] Field of Search ........................ 395/425; 364/200 MS File, 900 MS File

[56] References Cited

U.S. PATENT DOCUMENTS

| | | | |
|---|---|---|---|
| 4,636,946 | 1/1987 | Hartung et al. | 395/425 |
| 4,875,155 | 10/1989 | Iskiyan et al. | 395/425 |
| 4,916,605 | 4/1990 | Beardsley et al. | 395/425 |
| 5,263,145 | 11/1993 | Brady et al. | 395/425 |
| 5,283,884 | 2/1994 | Menon et al. | 395/425 |
| 5,287,473 | 2/1994 | Mohan et al. | 395/425 |
| 5,301,297 | 4/1994 | Menon et al. | 395/425 |

OTHER PUBLICATIONS

"A Case for Redundant Arrays of Inexpensive Disks (RAID)", D. A. Patterson, et al., 1988, Computer Science Division, University of California, Berkeley, pp. 109–116.

"Virtual Memory Management in the VAX/VMS Operating System", Henry M. Levy, et al., Digital Equipment Corporation, Mar. 1982, pp. 35–41.

*Primary Examiner*—Glenn Gossage
*Assistant Examiner*—Frank J. Asta
*Attorney, Agent, or Firm*—R. Bruce Brodie

[57] ABSTRACT

A method and means using a fast write in order to eliminate DASD time from the write response time as seen by the host; eliminate some DASD writes due to overwrites caused by later host writes to previously updated blocks in cache; and reduce DASD seeks because destages will be postponed until many destages can be done to a track or cylinder. This is effectuated by destaging from the cache only the least recently referenced original or updated block and all other original or updated blocks occupying the same logical track and ordered in a predefined lower LRU range, the destage being initiated responsive to a cache miss. The destaging step is selectable from a set of destaging steps varying in their robustness.

9 Claims, 8 Drawing Sheets

FAST WRITE AND ROBUST DESTAGE FOR CACHE ORIENTED DASD ARRAY

FAST WRITE AND ROBUST DESTAGE FOR CACHE ORIENTED DASD ARRAY

LOGICAL AREAS OF MEMORY IN DASD ARRAY CONTROLLER data from CPU 1 placed in 2 buffer locations data logically moved to cache − send "done" msg to CPU

STEPS:

Read D1 and XOR to D1'
    Read P and XOR to D1'
    Write D1'
    Write new P

PROBLEM:

Error XORing D1 & loss of D1'

Limited Robust Destage Steps

| STEPS: | Bus B/W | Memory B/W |
|---|---|---|
| Make 3rd copy of D1' at loc Y | X | 2X |
| Read D1; XOR to Y | X | 2X |
| Read P; XOR to Y | X | 2X |
| Write D1' | X | X |
| Write new P | X | X |
| | 5X | 8X |

DATA LOSS SITUATION

— Hard memory error while writing new P from loc Y
— Cannot read one of blocks D2, D3, .. D6

MODERATE ROBUST DESTAGE STEPS

STEPS:

Make 3rd copy of D1' at loc Y
Read D1, store to one side; XOR to Y
Read P, store to one side; Xor to Y
Write D1'
Write new P

NO DATA LOSS IF ALL WRITES AFTER ALL READS DONE

HIGHLY ROBUST DESTAGE STEPS

ASPECTS OF DESTAGING PARITY GROUP

METHOD AND MEANS FOR FAST WRITING DATA TO LRU CACHED BASED DASD ARRAYS UNDER DIVERSE FAULT TOLERANT MODES

FIELD OF THE INVENTION

This invention relates to direct access storage device (DASD) arrays, and more particularly to a method and means for fast writing of blocks to a least recently used (LRU) cache oriented DASD array and for recovery in the event that a predetermined number of hard and soft failures occur during cache/DASD array destaging.

DESCRIPTION OF RELATED ART

In this specification, a direct access storage device (DASD) is taken to mean a rotating tracked magnetic data storage medium or the like accessed by physical positioning read/write transducers over predetermined portions of one or more of the tracks. Also, an array of DASDs is taken to mean two or more DASDs storing data and redundancy information and an associated control unit operative such that data can be automatically recovered when a path to that data is made unavailable due to DASD failure or the like.

RAID Array Classification and Redundancy Codes

Patterson et al, "A Case for Redundant Arrays of Inexpensive DASDs (RAID)", ACM SigMOD Conference, Chicago Ill. Jun. 1-3, 1988, described graduated DASD array configurations running from RAID 1 through RAID 5.

RAID 1 covers DASD mirroring where all records or pages are duplexed. For efficiency, RAID 1-3 usually involve synchronous read or write operations, while RAID 5 supports selective asynchronous access.

RAID 2 utilizes synchronous writing onto an array of m+n DASDs of a logical association of m data bits with n Hamming redundancy bits interspersed where the logical and physical recovery domains are coextensive. Hamming codes can provide a correction capability absent any independent indication of DASD failure.

RAID 3 involves synchronous writing onto an array of m+n DASDs of a logical association of m data blocks and n redundancy blocks (recovery or redundancy group) where the logical and physical recovery groups are also coextensive. RAID 3 relies on independent failure indication of the DASD in order to facilitate recovery action over the remaining members of the recovery group.

RAID 5 involves the selectable asynchronous writing of a logical association of m data and n redundancy blocks over any subset <m+n DASDs where the interleave depth is variable and where the redundancy blocks are distributed over two or more DASDs. Redundancy blocks are computed over the data blocks such as simple parity. They may involve two or more blocks such as a Reed-Solomon or B-Adjacent codes. In the latter cases, some of the redundancy blocks are involved with the computation of others of the redundancy blocks.

Parity Codes

It should be appreciated that simple parity codes have been the codes of choice for recovery from single DASD failures in RAID 3- 5 arrays. Such coding is obtained from a simple exclusive OR'ing (XOR) over the data blocks to which it is logically associated. Its use in DASD arrays was originally described in Ouchi, U.S. Pat. No. 4,092,732, "System for Recovering Data Stored in a Failed Memory Unit", issued May 30, 1978.

It is clear that parity must be tested for each access and especially for write updates for blocks not in cache. It is also clear that such updates require at least four array accesses/update. This involves reading the old parity and the old data, calculating the new parity, and writing out the new data and the new parity. The parity calculation itself for a write update involves XOR'ing of old data, new data, and old parity (see Patterson and Ouchi).

DASD Array Transparency Mediated by a READ/WRITE Cache

Read and write data caching is a well known buffering technique rendering access of external storage as transparent to the host CPU as possible. The cache is formed from electronic (usually semiconductor) memory which orders of magnitude faster than DASD storage. The theory is that applications executing on a CPU will reference and re-reference a small subset of the array stored data. If this referenced subset is stored on faster memory, then I/O throughput more closely approximates the CPU speed reducing the amount of CPU task switching to other processes while awaiting data as would be required were the speed mismatch unrelieved.

A match between a CPU access request and data resident in cache is termed a "hit" while the absence of a match is termed a "miss". A miss requires the DASD array to be accessed and the required data transferred (staged) to the cache. Since the cache is usually full, one or more blocks must be either overwritten or transferred (destaged) from cache to the array. If the blocks in cache are time stamped or re-queued each time they are referenced by the CPU, then a least recently used (LRU) discipline can be invoked to decide which block or blocks should be either destaged or overwritten to make space available for the most recent block to be added to the cache.

Cache to RAID 5 Array Writing, Floating Parity, and Log Structured File

RAID 5 DASD arrays perform well on transaction processing systems and they achieve high availability in a cost-effective way. However, their principal drawback is the performance penalties of executing write updates, especially single block updates. Such updates can cause degradation in DASD subsystem performance over a subsystem that does not use the parity technique.

RAID 5 DASD arrays using parity based redundancy can improve write performance using methods known in the prior art. These include floating parity, log-structured file, and fast write.

Floating Parity

Floating parity is described in the copending application Menon et al, U.S. Ser. No. 07/600,034, "Fast Updating of DASD Arrays Using Selective Shadow Writing of Parity and Data Blocks, Tracks, or Cylinders", now U.S. Pat. No. 5,375,128. Menon points out that a floating parity technique which sacrifices DASD storage efficiency can improve write performance by relaxing the requirement that the modified data and parity blocks be written back into their original locations.

More particularly, Menon's method write updates by first reading the old block and old parity in one track revolution. Next, it calculates the new parity (XOR of old values of data blocks and group parity and new data block value). During a second revolution of the DASD containing the data block, it writes the new data block in place. The new value of parity is shadow written in the first available table controlled free space on the parity tracks. Lastly, the tables are modified to indicate that the old parity block space is available.

Significantly, this technique improves the DASD service time to complete an update and reduces the four accesses to three and, in some cases, to two.

Log Structured File

A Log Structured File (LSF) organized external store writes all updates at the end of the log and the space occupied by the original record is immediately reclaimed. This avoids file or record fragmentation. Thus, there is always room at log end for a variable length record. While there is a wrap back, garbage collection and rewrite should occur with sufficient frequency to always assure sufficient space.

In the LSF arrangement, the means for staging and destaging convert single block updates into large (many block) updates where there are at least as many data blocks in the large update as there are data blocks in a parity group. In this case, the entire parity group can be written as a sequential stream, and there will be no need to read old data or old parity blocks, since the new parity can be calculated directly from the new data blocks to be written.

FAST WRITE

Beardsley et al, U.S. Pat. No. 4,916,605, "Fast Write Operations", issued Apr. 10, 1990 discloses fast write operations in which a DASD subsystem concurrently stores time stamped data from a host in a cache and a non-volatile store (NVS) and sends a completion signal to the host. The subsystem then asynchronously destages the blocks to DASD from the cache and on a batched postings basis to a log from the NVS, the latter being for use in recovery.

While Beardsley treats recovery in the dual copy sense, it remains silent as to the optimal tuning of cache staging to the backing store (DASD or DASD array) and recovery from a mix of concurrent hard and soft failure occasioned during data movement between a cache and a DASD array.

SUMMARY OF THE INVENTION

It is accordingly an object of this invention to devise a method and means for fast writing of blocks to an LRU cache oriented DASD array and for recovery in the event that a predetermined number of hard and soft failures occur during cache/DASD array destaging.

It is a related object that such method and means minimize the number of accesses required to effectuate destaging and processing any requisite redundancy while preserving the DASD array subsystem's ability to recover from failure.

It is yet another object that such method and means employ a fast write in order to eliminate DASD time from the write response time as seen by the host; eliminate some DASD writes due to overwrites caused by later host writes to previously updated blocks in cache; and reduce DASD seeks because destages will be postponed until many destages can be done to a track or cylinder.

It was unexpectedly observed that an optimal balance between the number of blocks to be destaged from the cache to the array at one time for both space and data backup could be struck if in response to a cache miss, the eligible changed or updated blocks were to include (1) the LRU changed block and (2) all other changed blocks occupying the same logical track and ordered in a predefined lower LRU range.

The invention is implemented in a storage subsystem having an array of selectably accessible DASDs, a cache and non-volatile store (NVS) coupling said array, and means responsive to read, write, and write update references from at least one external source for staging and destaging logical tracks of block organized data or portions thereof between the cache or NVS and selectable ones of the DASDs. In this subsystem, a cache miss requires the destaging from cache of at least a newly written block or an updated block.

Now, a LRU cache has a predetermined storage capacity above which capacity at least one cache resident block would be destaged on the next miss reference to said cache. Data changes and copies made to the blocked portions are written initially to the cache and NVS and thereafter posted to the array only upon destaging.

The improved method and means for fast writing of blocks comprising the steps of (a) being responsive to each write or write update reference by concurrently recording each subject block in the cache and a copy in the NVS, providing a completion indication to the external referencing source, and maintaining newly written, updated, and read only blocks in cache in least recently used (LRU) order; and (b) being responsive to each reference which results in a cache miss by destaging from the cache to ones of the selectably accessible DASDs the LRU newly written or updated block and as many of the other newly written or updated blocks on the same logical track conditioned by said other newly written or updated blocks being located in a predetermined LRU portion of the LRU order of cached blocks.

It is an aspect of this invention that in a storage subsystem of the type described, groups of blocks (d1, d2, ... dn) are associated into a a logical construct termed a 'domain' including a parity block (P). Any change in at least one block (d1') of a domain (d1,d2, ..., dn,P) also requires a change in the domain parity block (P).

It is a further aspect of this invention that the destaging step (b) is selectable from a set of destaging steps varying in their robustness. The most robust one of the set includes the steps of (b1) copying the changed block (d1') to another cache location (Y), ascertaining whether the original block (d1) is present in cache, if not present, copying the block (d1) from the array to cache, and logically combining the original and changed blocks (d1 XOR d1') in said other cache location (Y); (b2) copying the parity block (P) of the associated domain from the array to cache and NVS and logically combining P with the contents of said other location Y (d1 XOR d1' XOR P); and (b3) independently destaging from the cache to the array the changed block (d1') and logically combined contents of said other cache location (P'), the latter operative as the new parity for the domain.

To avoid any data loss occasioned by two hard errors and a transient error, it is necessary to wait until d1 and P have been read from DASD and XOR'ed at location Y prior to writing d1' and P' to DASD.

It is an aspect of this invention that the destages to a parity group are serialized by use of the parity group lock. The parity group lock also prevents the array control unit from using the DASD values of the data and parity blocks of the parity group to rebuild a bad block in the parity group. That is, a block will not be rebuilt unless the parity group is consistent on DASD. When new blocks are received from an accessing CPU, the parity group lock can be used to determine if a destage is in progress which, in turn, will determine if the new block received is to be of type an early or subsequent modification.

It is yet another aspect of this invention that destaging either the entire parity group or part of said group from cache to array also requires robust steps to mitigate against combinations of hard and soft failures. These are more fully elucidated in the description of the preferred embodiment.

DESCRIPTION OF THE PREFERRED EMBODIMENT

Prior Art Fast Write to a DASD Storage Subsystem

Figure 1:
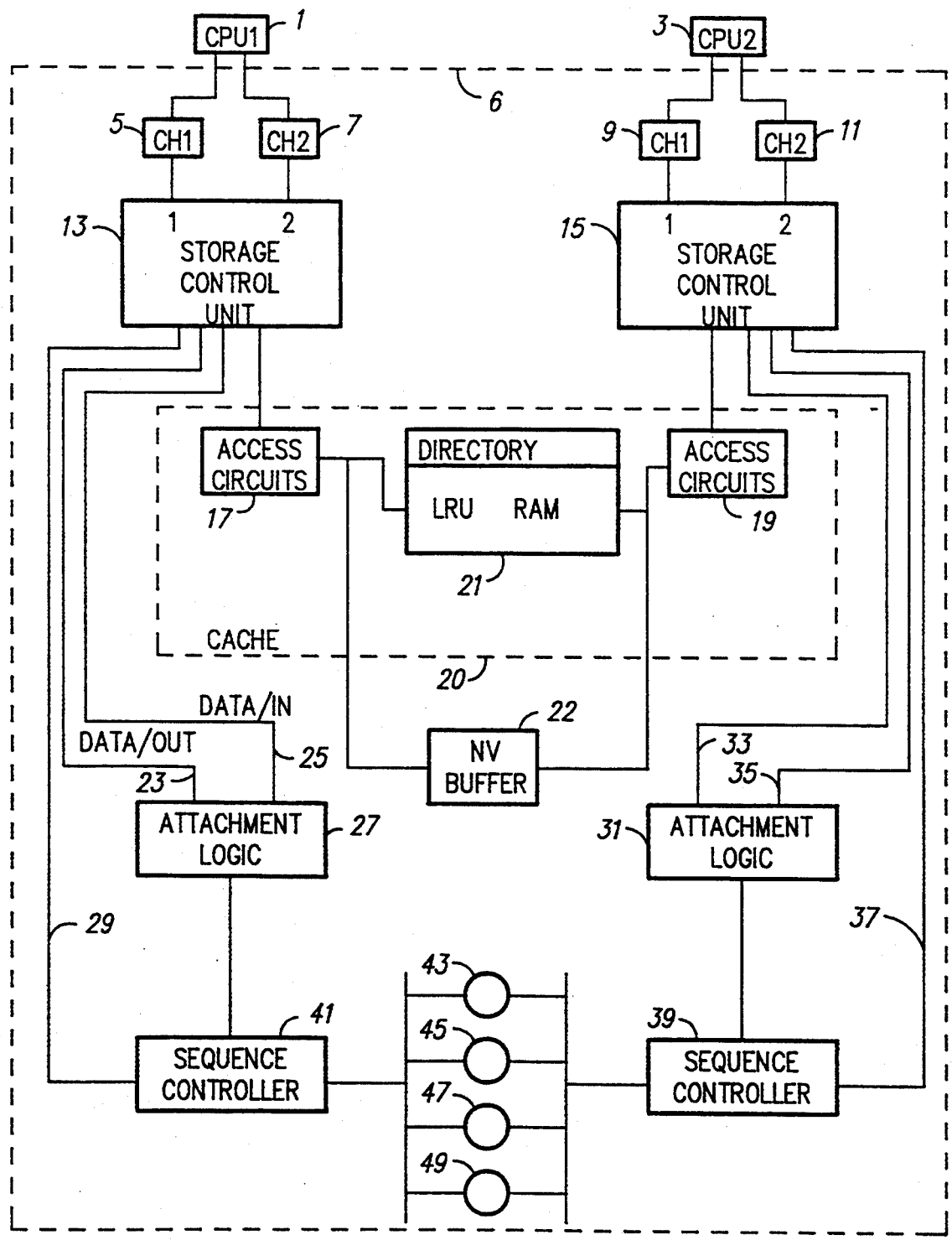
FIGS. 1 shows dual ported DASDs and a RAM cache and a nonvolatile store (NVS) according to the prior art.

Referring now to FIG. 1, there is shown a cache oriented DASD storage subsystem according to the prior art. As depicted, CPU's 1 and 3 each access both internal storage within their respective bounds (not shown) and external storage 6 over respective paths 5 and 7 or 9 and 11. For completeness, it should be noted that internal storage includes processor storage and expanded storage. In this regard, processor store operates on a byte addressable random access while the expanded store operates on a file/record/page addressable random access basis.

External storage 6 comprises one or more DASD accessed through data and control paths including storage control units 13 or 15, DASD subsystem cache 20, and attachment and sequence controller logic 27 and 41 or 31 and 37.and stores the file/record/page of the information referenced by applications executing on CPU 1.

In the prior art, write requests were accepted from the host processor 1 or 3, keeping two copies of write information in cache LRU RAM 21 and nonvolatile buffer 22, signaling the host that a write operation is complete as soon as the cache and nonvolatile storage is updated successfully and writing the information to one of the DASDs 43, 45, 47,or 49 later. A copy of the nonvolatile storage contents is periodically transferred onto a partition of a circular journal recorded on a nonvolatile medium and selected entries are periodically transferred from one partition to another partition of the journal (not shown) after the destaged records have been eliminated.

The prior art systems could guaranty that every change is recorded either in the journal or the DASD. Because of the finite length of the journal, free space was made available routinely. Under this system of the past, no checkpointing of data to DASD was necessary and performance was enhanced by reducing the number of required DASD accesses by turning the cache into a highly reliable primary store.

Fast Write and Robust Destage Architecture of the Invention

Figure 2:
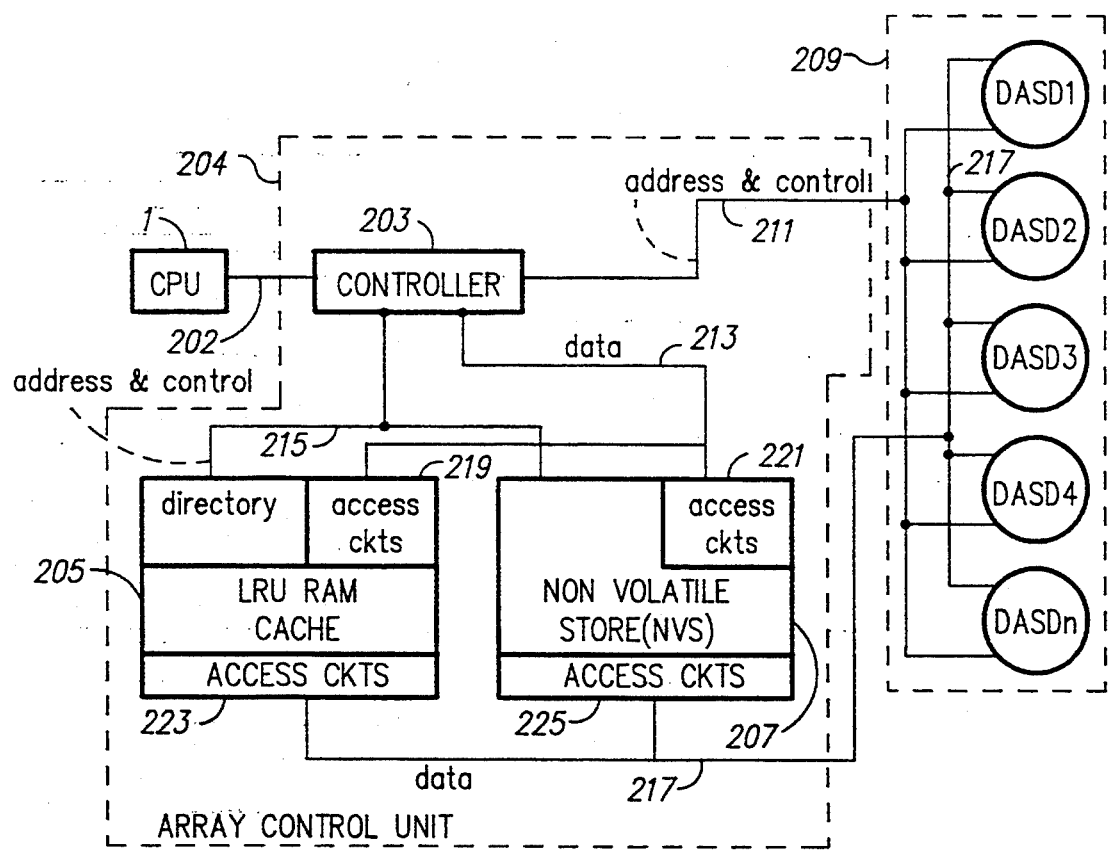
FIG. 2 illustrates a cache oriented DASD array architecture supportive of a fast write and robust destaging according to the invention.

Referring now to FIG. 2, there is shown a CPU 1 accessing a DASD array control unit 204 over a path 202. Typically, such paths are demand/response or polling interfaces in which the host expresses access requests in a high level access or channel command language which is interpreted by a control unit controller (CU) 203. The CU accesses the directory of cache 205 over control path 215 and data path 213 to ascertain whether a file/record/block/is cache resident. If the file/record/block is not resident, then a designated block or blocks are destaged to the DASD array (DASD1, ..., DASDn) over control path 211 and data path 217.

Whenever the CU 203 receives a request to write a data block, it must also update the corresponding parity block for consistency. If D1 is to be altered, the new value of P1 is calculated as:

new P1=(old D1 XOR new D1 XOR old P1) Since the parity must be altered each time the data is modified, these arrays require four DASD accesses to write a data block:
(1) Read the old data
(2) Read the old parity
(3) Write the new data
(4) Write the new parity Fast Write and Destage Overview in the Invention In this invention, "Fast Write" eliminates DASD time from the host response time to a write, by using cache and a buffer both preferably expressed in battery backed silicon RAM memory in cache 205 and NVS 207. A block received from a host system is initially written to cache and NVS in the DASD array controller. That is it is written in two failure independent locations. Consequently, no single memory or power failure can cause a loss of data. At this point, CU 203 returns a successful completion of the write message to CPU 1 over path 202. Actual destage of the block from cache 205 or NVS 207 to DASD array 209 is done asynchronously at a later time.

DASD blocks in array controller cache memory that need to be written to DASD are those that constitute original or first written blocks or those that have been amended or modified in some way. The literature sometimes uses the term "dirty block" to designate a first written, or changed or amended block. Such dirty blocks are written to the DASD array 209 in a process called "destaging".

When a block is destaged to the DASD, it is also necessary to update, on DASD, the parity block for the data block. As previously discussed, this may require the array controller 203 to cause the old values of a resident data block and the parity block from array 209 into cache 205 over path 217 and access circuits 223, XOR them with the new value of the data block in the cache, then write the new value of the data block and of the parity block to array 209 again over access circuits 223 and path 217. Array access is governed by CU 203 over address and control path 211 while cache 205 and NVS 207 is governed over address and control path 215, data path 213 and access circuits 219 and 221.

Since many applications first read data before updating them, it is expected that a significant fraction (majority) of the time that the old value of a data block already resides be in cache 205. Therefore, the more typical destage operation is expected to require one DASD read and two DASD writes instead of the theoretical two DASD reads and two DASD writes.

Cache Organization, LRU Discipline, and Blocks Eligible for Destaging

Typically, the blocks both dirty and clean in cache 205 are organized in Least-Recently-Used (LRU) fashion. When space for a new block is needed, the LRU block in cache is examined. If it is clean, the space occupied by that LRU block can be immediately used;. In the event that the block has been changed i.e. "dirty", the block must be destaged before the cache space can be rewritten.

While it is not necessary to postpone destaging a dirty block until it becomes the LRU block in the cache, the argument for doing so is that it could avoid unnecessary work. Consider that a particular block has the value d. If the host later writes to block d and changes its value to d', then dirty block (d') now resides in cache which would have to be destaged later. However, if the host writes to this block again, changing its value to d", before d' became LRU and was destaged, it would follow that there was no longer any need to destage d'. Thus, some work is avoided.

When a block is ready to be destaged, the CU 203 has the capacity to destage other dirty blocks in the cache that need to be written to the same track, or the same cylinder. This helps minimize DASD arm motion by clustering together many destages to the same DASD arm position. However, this also means that some dirty blocks are destaged before they become the LRU block in cache 205. These latter blocks will be destaged at the same time as some other dirty block that became LRU and that happened to be on the same track or cylinder. Thus, the destage steps must trade-off the reduction in destages resulting from awaiting overwrites of dirty blocks the reduction in DASD seeks that can be achieved if multiple blocks are destaged at the same track or cylinder position together.

Significantly, this invention destages from cache to a DASD array when a dirty block becomes LRU. Also destaged are all other dirty blocks on the same track (cylinder) as long as these other blocks are in the LRU half of the LRU chain of cached DASD blocks.

The express limitation in the preceding paragraph assumes that no destaging begins until a dirty block becomes LRU. One modification is the invocation of a background destage process that continually destages dirty blocks near the LRU end of the LRU list (and others on the same track or cylinder) so that a request that requires cache space (such as a host write that misses in the cache) does not have to wait for destaging to complete in order to find space in the cache.

Managing the Data in Array Cache

Figure 3:
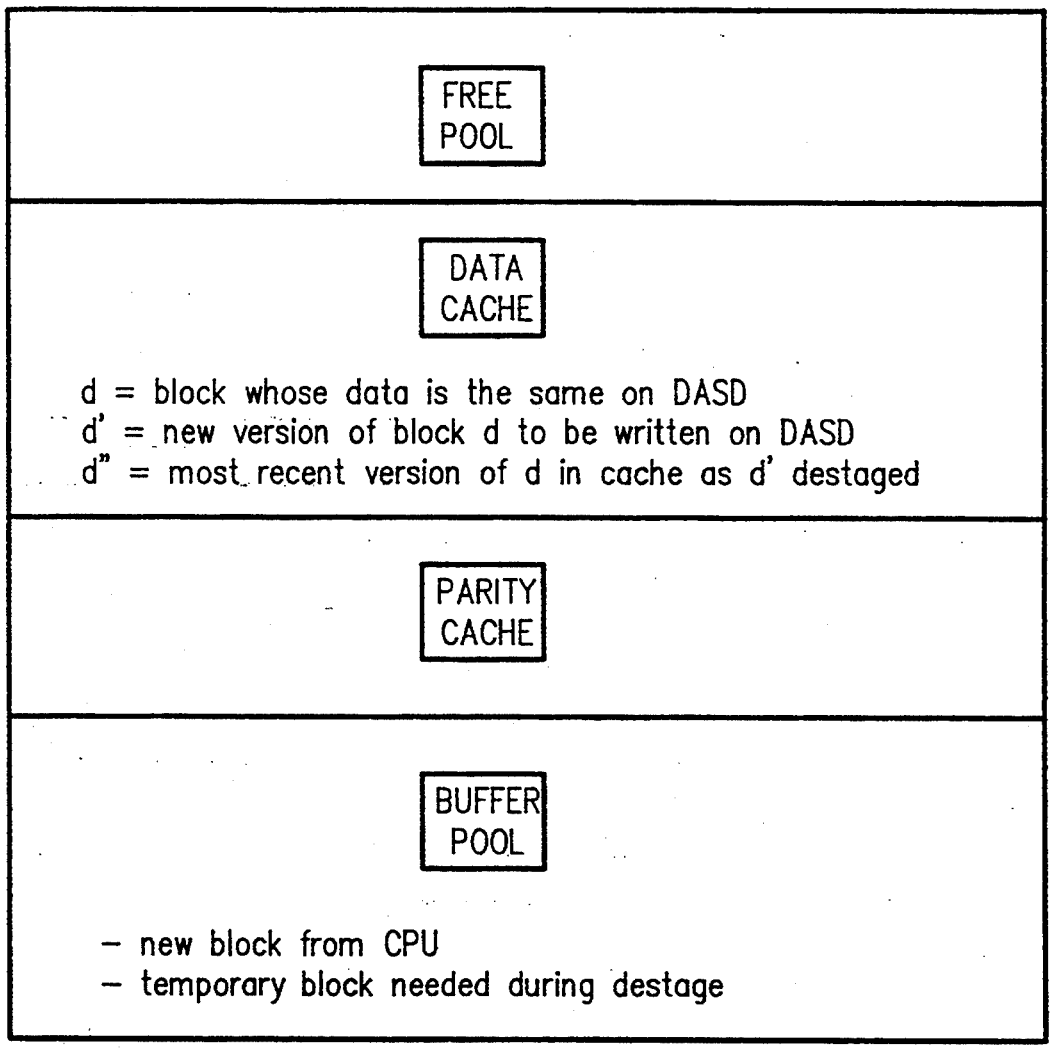
FIG. 3 sets out four logic areas of failure independent data memories used as caches.

Referring now to FIG. 3, there is set out four logic areas of failure independent data memories used as caches. These are designated as the free pool, the data cache, the parity cache and the buffer pool.

Figure 4A:
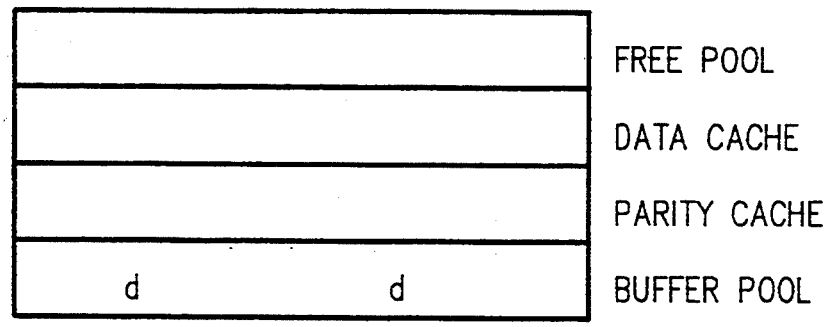
FIGS. 4A, 4B, and 4C depict data movement among the memories in a typical write operation.
Figure 4B:
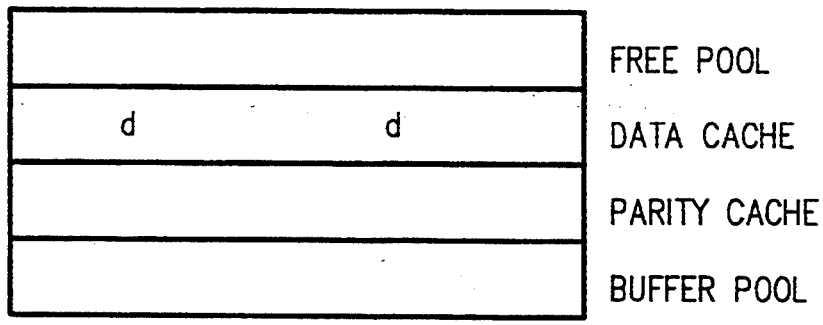
Figure 4C:
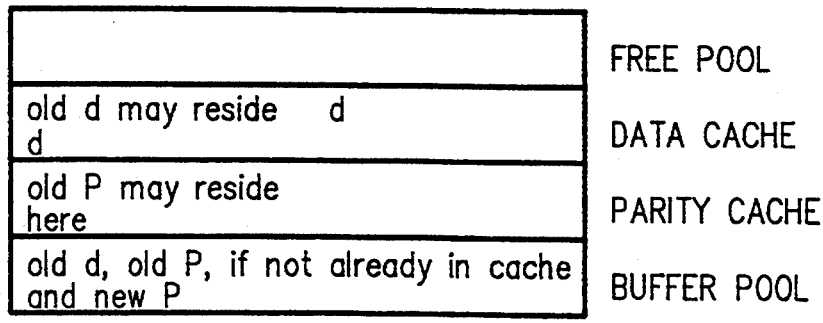

Referring now to FIGS. 4A–4C, there is shown the use of these four memory regions during the execution of a typical write request from the host. In these figures, the dotted line separates the two different power or failure independence boundaries. When a block is written by the host, it is placed in the buffer pool, in two separate power boundaries by the host interface (not shown). Subsequently, the two data blocks are moved into the data cache (this is a logical, not a physical move. That is, the cache directories are updated to reflect the fact that the block is in cache). After this logical move of the blocks into the data cache, the CU 203 returns "done" to the host system that initiated the write operation. At some subsequent time, the block D is destaged to DASD.

Several Destaging Methods of Varying Robustness from Cache to DASD Array

Serialization and Locking

As may be recalled, the parity group is the unit of consistency in the DASD array. If a dirty DASD block is destaged to DASD, the corresponding parity block must also be calculated and written in order to retain consistency. When a block from a parity group is to be destaged from cache, the parity group is locked for the duration of the destage. The parity group is unlocked only after the data block and the parity block are both written to corresponding DASDs in array 209 and the consistency affirmed. Note, concurrent destages to the same parity group must serialize on the parity block p. In this invention, the destages to a parity group are serialized by use of the parity group lock. The parity group lock also prevents CU 203 from using the DASD values of the data and parity blocks of the parity group to rebuild a bad block in the parity group. That is, a block will not be rebuilt unless the parity group is consistent on DASD. When new blocks are received from the CPU 1, the parity group lock can be used to determine if a destage is in progress which, in turn, will determine if the new block received is to be of type d' or d".

To summarize, the three processes that need to be aware of the parity group locks are—the destage process, the rebuild process and the process that moves new blocks into the cache. In particular, note that parity group locks do not prevent reading DASD blocks to be sent to the CPU.

The parity lock table is maintained in a control store portion of CU 203 internal memory (not shown). There are two copies of every lock table entry, one on each power boundary, to ensure that access to the locks is not lost. To minimize the size of the parity group lock table and make it independent of the number of parity groups and, hence, the number of DASDs, only entries for locked parity groups are maintained using a hashed structure. While not explicitly referred to in the destaging methods that follow, a parity group is locked before a destage begins and is unlocked after the destage completes.

Cache to DASD Array Destage Method 1

Figure 5:
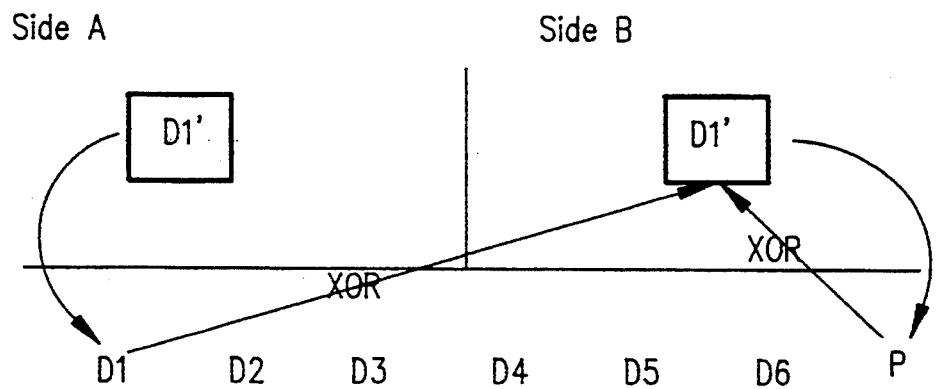
FIG. 5-7 depict block destage steps of increasing robustness.

Referring now to FIG. 5, there is depicted the simplest destaging method. In this figure, the dotted line separates two different power boundaries in the array controller. Thus, two copies of modified block D1' are on two different power boundaries. Also, the solid horizontal line separates the array controller CU from the DASD drives themselves. This figure also depicts six data blocks D1, D2, ... D6, on six different DASDs and a seventh parity DASD block P on a seventh DASD drive (se FIG.2 array 209). These seven DASD blocks on seven different DASDs constitute the parity group of interest. D1' is an updated value of block D1 which is to be destaged to DASD.

In this option, block D1 and block P are both read from DASD and XOR'ed directly into one of the two D1' locations in controller memory. This would use the store & XOR feature of the data memory previously described.

Note the blocks do not need to be read from DASD if D1 and P are already in cache. Also, because the XOR operation is commutative, the XOR of D1 and the XOR of P may happen in either order. One operating implication is that two different DASD operations may be started in parallel in parallel and do not need to serialize the two different DASD seeks on the two different DASDs. D1' may be written to DASD anytime after D1 has been read and XOR'ed. When both D1 and P have been read and XOR'ed to one of the two copies of D1', this location now contains P' the new value of P which may now be written to DASD. This permits RAID 5 operation.

Robustness of the First Method

The method shown in FIG. 5 is robust in that no single error in any part of the system can cause it to fail. However, it would not be considered robust enough for many situations, since there are multiple failures that can cause loss of data. For example, a transient error during the process of XOR'ing D1 into one of the two D1' locations, coupled with a hard failure or loss of the other copy of D1' results in a situation where D1' is lost by the array controller (both copies are damaged). Since the array controller had previously assured the host system that the write of D1' was done as part of the Fast Write operation, this loss of D1' is unacceptable. In the case discussed, the unavailability of data was caused by one soft and one hard failure. Soft or transient failures occur an order of magnitude more frequently than hard failures.

Furthermore, these two error occurrences may have been separated considerably in time. For example, the hard failure (ECC error) of one copy of D1' may have happened soon after D1' was received from the host, but remained undiscovered for a long time. The transient error occurred much later, during destage, when D1 was XOR'ed into another copy of D1'. Only after the transient error occurred did we try and read the other copy of D1' to find that it was unreadable due to a hard (ECC) error. By then it is too late, and the lost data.

Cache to DASD Array Destage Method 2

Figure 6:
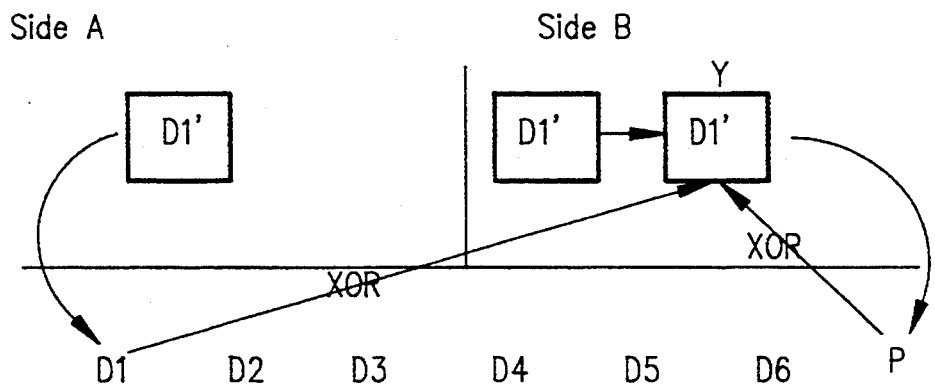

Referring now to FIG. 6, there is set out a more robust version of method 1. The first step is a memory to memory copy operation that creates a third copy of D1'. The remaining steps of method 2 are identical to method 1. Note, that new parity is created at the location where the third copy of D1' is made (location Y).

Robustness of the Second Method

The second method is robust enough for most situations. However, it is not as robust as a DASD controller that does mirroring for the following reason. When the DASD controller doing mirroring begins a destage, it writes one copy of the DASD block to one DASD, another copy of the DASD block to the mirror DASD. The destage can complete even if a DASD other than the two involved in the destage were to fail and, concurrently, a memory failure on one power boundary were to occur. In other words, it can survive two hard failures.

Consider the same set of failures for the DASD array controller shown in FIG. 2. Assume that CU 203 has just completed writing D1' and that we have started to write new P' when there is a hard error in the memory location containing new P' (location Y). Therefore, the location and data that was to contain new P' is not available. The cache or NVS location used to contain the old value of P, but it now contains neither P nor P'.

To complete the destage correctly, P' must be recalculated and written to the appropriate DASD location. Since D1' has already been written to DASD, P' can not be re-computed in the same way. Recall, the former parity computation included reading D1 and using D1 to calculate P'. Since D1 on DASD has already been overwritten with D1', P' must be recalculated by reading D2, D3, . . . , D6 and XOR'ing them all together and with D1'. If one of the DASDs containing D2, D3, . . . , D6 also fails, then new P' cannot be determined.

Cache to DASD Array Destage Method 3—Most Robust.

Figure 7:
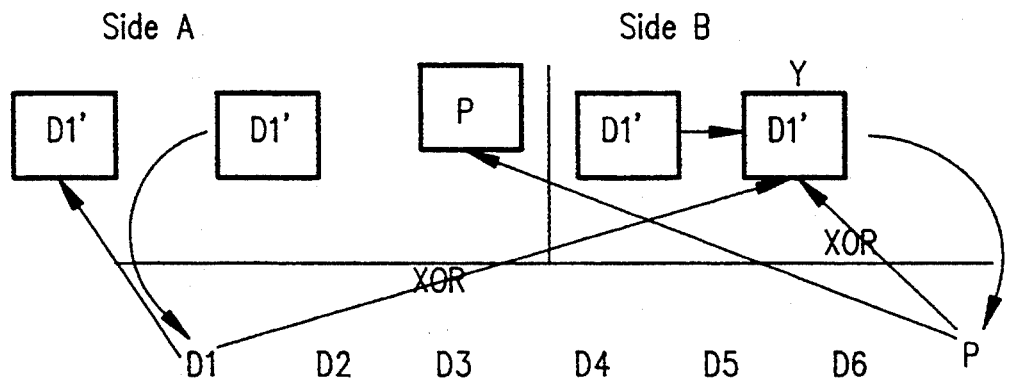

Referring now to FIG. 7, there is shown the most robust of the destaging methods. The steps comprise:
 (a) making a third copy of D1' at location Y;
 (b) in any order, reading D1 from DASD and XOR'ing it to Y and also make a copy of D1 on the other power boundary;
 (c) reading P from DASD and XOR'ing it to Y and also making a copy of P on the other power boundary; and
 (4) after all reads and XORs are done, writing D1' and new P' (from location Y) to DASDs in any order.

By waiting for all reads and XOR operations to complete before beginning any writes, this method is robust against a combination of three failures; the hard failure of one of the two memory cards, the failure of one of the DASDs containing D2, D3, . . . , D6, and a transient failure while reading and XOR'ing D1 or P. Key to achieving this robustness is ensuring that old values of D1 and P are read into a different power boundary than location Y which contains the third copy of D1'. This, in effect, means that two copies of new parity are present in cache before we begin writing to the DASDs; one at location Y and one which can be created on the other power boundary by XOR'ing D1', D1 and P.

Other Destage Cases

Figure 8:
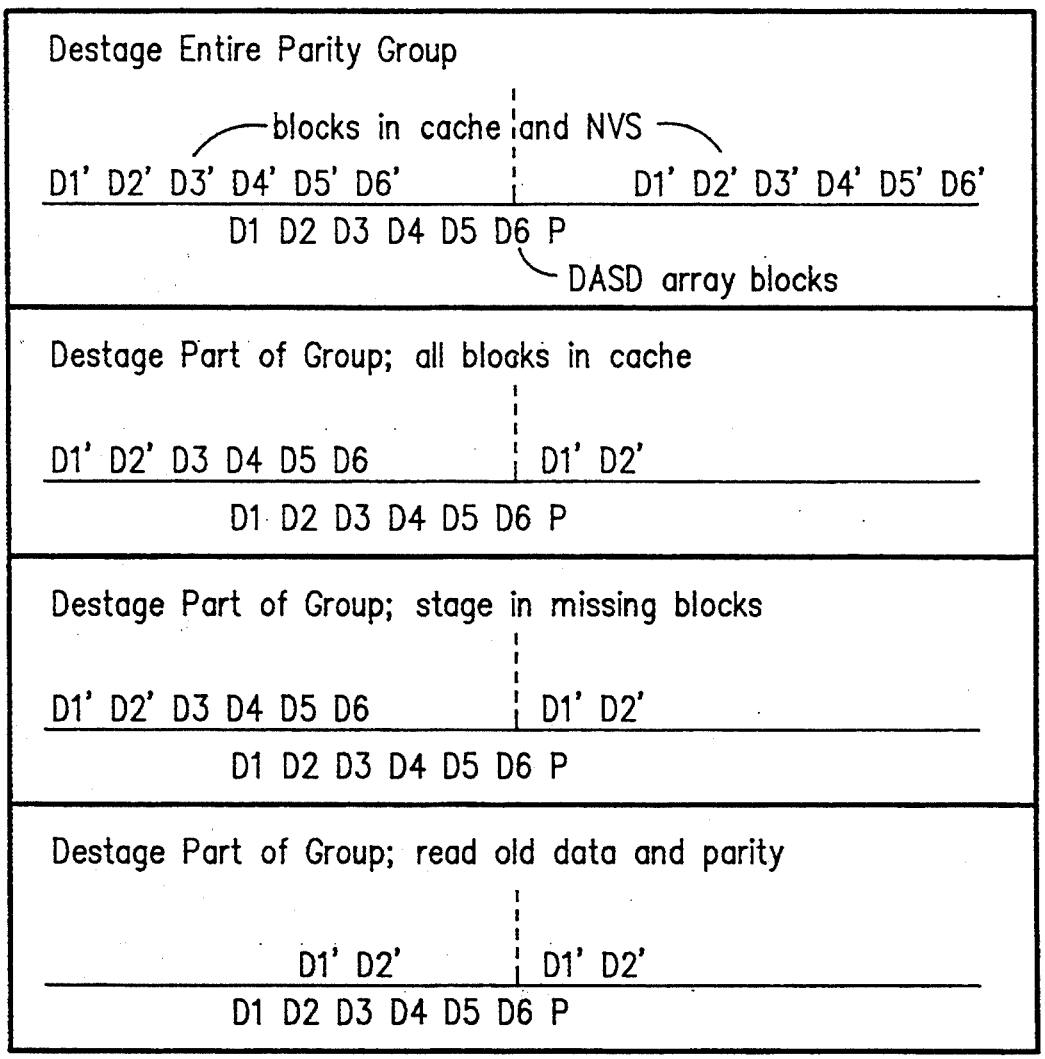
FIG. 8 shows the steps of destage of a multiple block parity groups.

Referring now to FIG. 8, in the complete operational context of this invention, one of four possible destage situations that may arise. As depicted, the destaging case applicable depends on how many data blocks of the parity group are to be destaged and how many of them are in cache (by definition, all the blocks to be destaged are in cache in two separate locations). In FIG. 8, all blocks in cache that are dirty are designated by D1'. These are the blocks to be destaged. The four cases are:
 (1) Destage entire parity group
 (2) Destage part of parity group; entire parity group in cache
 (3) Destage part of parity group; read remaining members of parity group to create new parity
 (4) Destage part of parity group; read old values of data and parity to create new parity The robust cache to DASD array destaging methods are described in the following paragraphs in connection with each cases (1)–(4) and should be read with reference to FIG. 8.

Method for Destaging an Entire Parity Group

The method for destaging an entire parity group from an array cache to the DASD array comprises the steps of:
 (a) allocating a buffer (P1) to hold parity, initializing the contents of said buffer to zero, writing each block in the parity group to DASD, and XOR'ing each block concurrently with P1; and
 (b) writing the contents of P1 (new parity) to DASD after all the data blocks have been destaged.

By combining these steps, subsystem resources are conserved since the data block needs to be read only once from CU 203 memory. Alternatively, if the steps had been executed separately, then the block would have had to be read twice from cache memory i.e. the XOR first and the writing of the dirty block to DASD later.

For fast failure recovery, it is desirable to keep the dirty blocks to be destaged in cache until after the new parity block has been successfully written to DASD. Thus, if a failure occurs on the parity block write, the new parity can be regenerated without reading the data blocks from DASD.

Method for Destaging Part of a Parity Group When the Entire Parity Group is in Cache The method comprises the steps of:
(a) copying of one of the data blocks in the parity group that is not to be destaged at location P1, writing each dirty block in the parity group to DASD, and concurrently XOR'ing each dirty block with P1, P1 eventually containing the new parity to be written to DASD; and
(b) writing P1 to DASD after the other blocks of the parity group are XOR'ed with P1.

The robustness of this destaging method shows a proneness where CU 203 has completed writing one or more of the dirty blocks to DASD, but has not yet completed generated a new parity in P1, and where a clean data block that was about to be XOR'ed to form the new parity in P1 becomes unavailable. An example of the latter occurs where the cache memory location memory card that containing the clean block fails. In that event, it is necessary to read this block from DASD.

An alternative method which avoids the limitation so described comprises the steps of:
(a) making a copy of one of the data blocks in the parity group that is not to be destaged at location P1, XOR'ing all non-dirty data blocks of the parity group into P1. Make copy of result in P1 in a location in the failure independent NVS at P2; and
(b) writing each dirty data block to DASD while concurrently XOR'ing each dirty block with P1; and
(c) writing P1 (containing the new parity) to DASD after all XOR'ing is complete.

Note, in the alternative method loss of the clean block from cache during destage, permits generation of new parity without need to read any DASD stored block since a the copy of the result saved in P2 can be used.

Method for Destaging Part of Parity Group where Read Members not in Cache from DASD The assumption here is that only a very few of the blocks of the parity group are not in cache, so that it is faster to read these missing members in to generate the new parity than it is to read the old values of the blocks to be destaged. The related method comprises the steps of:
(a) allocating and zeroing out a cache buffer P1;
(b) reading from DASD every data block of the parity group that is missing in cache and XOR'ing said every data block with the contents of and into location P1;
(c) writing each dirty block in the parity group DASD, concurrently XOR'ing the same with Plafter all reads have completed, and XOR'ing with P1 the other blocks of the parity group that were neither dirty, nor missing in cache originally but not written to DASD; and
(d) write new parity in P1 to DASD.

The reason for first completing the reads of the data blocks missing in cache before allowing any writes to take place is to ensure that all such missing data blocks are readable. If one of these data blocks is unreadable, a different method (the one to be described next) would be used for destage.

Method for Destaging Part of Parity Group where Reading Old Values of Data and Parity is Required The method comprises the steps of:
(a) creating a third copy of one of the data blocks (say D) to be destaged in cache (say at location C), reading from DASD the old value of every data block to be destaged to DASD into a location in a failure independent NVS, and concurrently XOR'ing the old value of every data block into location C;
(b) reading from DASD the old value of parity to a location in NVS, concurrently XOR'ing the old value of parity with the contents of location C; and
(c) writing the new value of a block to DASD after the old value of the block has been read, writing C containing the new parity to DASD after all data blocks have been written and the old parity block has been read.

In this method it is necessary to wait until all old data and parity blocks have been read from DASD and XOR'ed to C, before writing new blocks to DASD. Without this restriction, data loss would result from the occurrence of two hard errors and a transient error. This could result from writing a new value of D to DASD (old value of D on DASD no longer available); loss of cache memory location containing old value of D, and transient error reading in old parity causes damage to location C (old value of D which was XOR'ed to C no longer available). It follows that CU 203 would be unable to read a data block (other than one of those being destaged) from DASD (such a block is needed to calculate new parity).

Extensions

These and other extensions of the invention may be made without departing from the spirit and scope thereof as recited in the appended claims.

We claim:
1. In a storage subsystem having an array of selectably accessible DASDs, a cache and non-volatile store (NVS) coupling said array, and means responsive to read, write, and write update references from at least one external source for staging and destaging logical tracks of block organized data or portions thereof between the cache or NVS and selectable ones of the DASDs, wherein a cache miss requires the destaging from cache of a selected newly written block or a selected updated block, a method for fast writing of blocks comprising the steps of:
(a) responsive to each write or write update reference, concurrently recording each subject block in the cache and a copy in the NVS, providing a completion indication to the external referencing source, and maintaining newly written, updated, and read only blocks in cache in least recently used (LRU) order; and
(b) responsive to each reference which results in a cache miss, destaging from the cache to ones of the selectably accessible DASDs the LRU newly written or updated block and as many of the other newly written or updated blocks which reside on the same logical track as the LRU newly written or updated block and which are located in a predetermined portion of the LRU order of cached blocks, wherein groups of blocks (d1, d2, ... dn) are associated into a 'domain' including a parity block (P), wherein any update in at least one block (d1') of a domain (d1, d2, ..., dn, P) requires a change in the domain parity block (P), and further wherein step (b) includes the steps of:

(b1) copying the updated block (d1') to another cache location (Y), ascertaining whether the counterpart newly written block (d1) is present in cache, if not present, copying the newly written block (d1) from at least one of the selectably accessible DASDs to cache, and logically combining the newly written and updated blocks (d1 XOR d1') in said other cache location (Y);

(b2) copying the parity block (P) of the associated domain from at least one of the selectably accessible DASDs to cache and logically combining it with the contents of said other location (d1 XOR d1' XOR P); and (b3) independently destaging from the cache to at least one of the selectably accessible DASDs the updated block and logically combined contents of said other cache location (Y), the latter being operative as the new parity for the domain.

2. The method according to claim 1, wherein groups of blocks (d1, d2, ... dn) are associated into a 'domain' including a parity block (P), wherein any update in at least one block (d1') of a domain (d1,d2, ..., dn,P) requires a change in the domain parity block (P), and further wherein said method includes the step concurrent with steps (a) and (b) of:

(c) responsive to a block from a parity group being destaged from cache, locking said parity group for the duration of the destage, said parity group being unlocked only after the data block and the parity block are both written to at least one of the selectably accessible DASDs and their consistency affirmed.

3. The method according to claim 1, wherein groups of blocks (d1, d2, ..., dn) are associated into a 'domain' including a parity block (P), wherein any update in at least one block (d1') of a domain (d1,d2, ..., dn,P) requires a change in the domain parity block (P), and further wherein step (b) includes the steps of:

(b1) reading blocks d1 and P from at least one of the selectably accessible DASDs and XOR'ing said blocks directly into the NVS at location D1, updated block d1' having been originally copied into cache and into location D1 at the time of the write reference from the external source; and (b2) writing d1' from cache and the XOR'ed contents of location D1 to at least one of the selectably accessible DASDs.

4. The method according to claim 1, wherein groups of blocks (d1, d2, ..., dn) are associated into a 'domain' including a parity block (P), wherein any update in at least one block (d1') of a domain (d1,d2, ..., dn,P) requires a change in the domain parity block (P), and further wherein step (b) includes the steps of:

(b1) making a copy of updated block d1' from cache to a second location Z in the NVS, updated block d1' having been originally copied into cache and into NVS location D1 at the time of the write reference from the external source;

(b2) reading blocks d1 and P from at least one of the selectably accessible DASDs and XOR'ing said blocks directly into the NVS at location Z; and (b3) writing d1' from cache and the XOR'ed contents of location Z to at least one of the selectably accessible DASDs.

5. The method according to claim 1, wherein groups of blocks (d1, d2, ... dn) are associated into a 'domain' including a parity block (P), wherein any update in at least one block (d1') of a domain (d1,d2, ..., dn,P) requires a change in the domain parity block (P), wherein the method step (b) is modified to include destaging an entire parity group from the cache to selectably accessible ones of the DASDs, comprising the steps of:

(a) allocating a buffer (P1) in cache to hold parity, initializing the contents of said buffer to zero, writing each block in the parity group to selectable DASDs, and concurrently XOR'ing each block with P1; and (b) writing the contents of P1 (new parity) to selectable DASD after all the data blocks have been destaged.

6. The method according to claim 1, wherein groups of blocks (d1, d2, ... dn) are associated into a 'domain' including a parity block (P), wherein any update in at least one block (d1') of a domain (d1,d2, ..., dn,P) requires a change in the domain parity block (P), wherein method step (b) is modified to include destaging part of a parity group to selectably accessible ones of the DASDs when the entire parity group resides in cache, comprising the steps of:

(a) copying of one of the data blocks in the parity group that is not to be destaged at location P1, writing each updated block in the parity group to selectable ones of the DASDs, and concurrently XOR'ing each updated block with P1, P1 eventually containing the new parity to be written to a selectable one of the DASDs; and (b) writing P1 to the selected one of the DASDs after the other blocks of the parity group are XOR'ed with P1.

7. The method according to claim 1, wherein groups of blocks (d1, d2, ... dn) are associated into a 'domain' including a parity block (P), wherein any update in at least one block (d1') of a domain (d1,d2, ..., dn,P) requires a change in the domain parity block (P), wherein method step (b) is modified to include destaging part of a parity group to selectably accessible ones of the DASDs when the entire parity group resides in cache, comprising the steps of:

(a) making a copy of one of the data blocks in the parity group that is not to be destaged at location P1, XOR'ing all non-dirty data blocks of the parity group into P1, and making a copy of the result in P1 in a location in a failure independent NVS at P2; and (b) writing each updated block to a selectable one of the DASDs while concurrently XOR'ing each dirty block with P1; and (c) writing the contents of location P1 to a selectable one of the DASDs after all XOR'ing is complete.

8. The method according to claim 1, wherein groups of blocks (d1, d2, ... dn) are associated into a 'domain' including a parity block (P), wherein any update in at least one block (d1') of a domain (d1,d2, ..., dn,P) requires a change in the domain parity block (P), wherein method step (b) is modified to include destaging part of the parity group where reading original blocks and parity is required, comprising the steps of:
  (a) making an additional copy of each the blocks di', dj' to be destaged in cache at locations Ci and Cj, reading from selectable ones of the DASDs the original value of every block di and dj to be destaged to selectable ones of the DASDs into a location in a failure independent NVS, and concurrently XOR'ing the original value of every block to be destages di and dj into locations Ci and Cj;
  (b) reading from a selectable one of the DASDs the original value of parity P to a location in the failure independent NVS, concurrently XOR'ing the original value of parity P with the contents of locations Ci and Cj; and
  (c) writing the new value of blocks di' and dj' to selectable ones of the DASDs after the original values di and dj of the blocks have been read, writing C containing the new parity to selectable ones of the DASDs after all blocks di' and dj' have been written and the original parity block has been read.

9. In a storage management subsystem (SMS) including an array of selectably accessible DASDs, a cache and a non-volatile store (NVS) communicatively attaching thereto, and means responsive to read, write, or write update references from an external source for staging and destaging of addressed logical tracks of data or blocked portions (sectors) thereof between said array and said cache, each read, write or write update reference to the SMS resulting in a hit if the block referenced by the access resides in the cache or a miss if the referenced block is not resident, the cache having a predetermined storage capacity above which at least one cache resident block is destaged on the next miss reference to said cache, data changes and copies being made to the blocked portions that are written initially to the cache and NVS and thereafter posted to said array only upon destaging, an improvement to the SMS for fast writing of blocks comprising:
  (a) means responsive to each write reference to the SMS for concurrently recording each changed block in the cache and a copy in the NVS, providing a completion indication to each referencing source, and maintaining the blocks in cache in LRU order; and
  (b) means responsive to each reference of the SMS which results in a cache miss for destaging from the cache to the DASD array of the LRU changed block and as many of the other changed blocks which reside on the same logical track as the LRU changed block and which are located in a predetermined portion of the LRU order of cached blocks;

wherein groups of blocks (d1, d2, ... dn) are associated into a 'domain' including a parity block (P), wherein any change in at least one block (d1') of a domain (d1, d2, ..., dn, P) requires a change in the domain parity block (P), and further wherein the destaging means further includes:
  means for copying the changed block (d1') to another cache location (Y), ascertaining whether the original block (d1) is present in cache, if not present, copying the block (d1) from the array to cache, and logically combining the original and changed blocks (d1 XOR d1') in said other cache location (Y);
  means for copying the parity block (P) of the associated domain from the array to cache and logically combining it with the contents of said other location (d1 XOR d1' XOR P); and
  means for independently destaging from the cache to the array the changed block and logically combined contents of said other cache location, the latter being operative as the new parity for the domain.

* * * * *

UNITED STATES PATENT AND TRADEMARK OFFICE
CERTIFICATE OF CORRECTION

PATENT NO. : 5,418,921
DATED : May 23, 1995
INVENTOR(S) : J. Cortney et al

It is certified that error appears in the above-indentified patent and that said Letters Patent is hereby corrected as shown below:

Column 14, line 33 delete the first "of"

Column 15, line 3, after "each" add --of--

Signed and Sealed this

Fifth Day of December, 1995

Attest:

BRUCE LEHMAN

Attesting Officer

Commissioner of Patents and Trademarks